(12) United States Patent
Lovell et al.

(10) Patent No.: US 12,550,977 B1
(45) Date of Patent: *Feb. 17, 2026

(54) COMFORT SYSTEM FOR BOOTS

(71) Applicant: Boot Royalty Company, L.P., Fort Worth, TX (US)

(72) Inventors: Billy Lovell, Mansfield, TX (US); Michael Fuller, Flower Mound, TX (US); Michael McCarron, Azle, TX (US)

(73) Assignee: Boot Royalty Company, L.P., Fort Worth, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/802,190

(22) Filed: Aug. 13, 2024

Related U.S. Application Data

(63) Continuation of application No. 17/835,123, filed on Jun. 8, 2022, now Pat. No. 12,082,645, which is a
(Continued)

(51) Int. Cl.
| | | |
|---|---|---|
| A43B 13/12 | (2006.01) | |
| A43B 3/04 | (2006.01) | |
| A43B 7/1405 | (2022.01) | |
| A43B 7/1425 | (2022.01) | |
| A43B 7/144 | (2022.01) | |
| A43B 7/1445 | (2022.01) | |
| A43B 7/148 | (2022.01) | |
| A43B 13/04 | (2006.01) | |
| A43B 13/14 | (2006.01) | |
| A43B 13/18 | (2006.01) | |
| A43B 13/38 | (2006.01) | |

(Continued)

(52) U.S. Cl.
CPC .............. *A43B 13/186* (2013.01); *A43B 3/04* (2013.01); *A43B 7/141* (2013.01); *A43B 7/1425* (2013.01); *A43B 7/144* (2013.01); *A43B 7/1445* (2013.01); *A43B 7/148* (2013.01); *A43B 13/04* (2013.01); *A43B 13/12* (2013.01); *A43B 13/127* (2013.01); *A43B 13/141* (2013.01); *A43B 13/188* (2013.01); *A43B 13/386* (2013.01); *A43B 17/00* (2013.01); *A43B 23/082* (2013.01)

(58) Field of Classification Search
CPC ....... A43B 13/12; A43B 13/18; A43B 13/125; A43B 13/127; A43B 13/186; A43B 13/41
USPC ............ 36/76 R, 72 A, 76 C, 25 R, 28, 30 R
See application file for complete search history.

(56) References Cited

U.S. PATENT DOCUMENTS

| | | | | |
|---|---|---|---|---|
| 4,694,591 A | * | 9/1987 | Banich ................... | A43B 13/12 36/31 |
| 5,134,791 A | * | 8/1992 | Gregory .................. | A43B 7/14 36/76 R |

(Continued)

*Primary Examiner* — Marie D Bays
(74) *Attorney, Agent, or Firm* — IP Attorneys Group, LLC

(57) ABSTRACT

A comfort system for Cowboy and work boots, including an insole chassis, an insole chassis backing board, and cushioning pads for absorbing and attenuating shocks encountered by a wearer of the boots. Cushioning pads are secured to a surface of the insole chassis backing board, and apertures in the insole chassis allow the cushions to pass through. Additional cushioning pads are retained in recesses in the midsole. Pads on insole chassis backing board and midsole are vertically aligned. A steel toe inset is utilized in conjunction with the comfort system for work boots. A rim may depend below the midsole to receive a foamed plastic pad.

20 Claims, 10 Drawing Sheets

Related U.S. Application Data continuation of application No. 16/860,463, filed on Apr. 28, 2020, now Pat. No. 11,382,386, which is a continuation of application No. 15/981,188, filed on May 16, 2018, now Pat. No. 10,638,813, which is a continuation of application No. 15/198,968, filed on Jun. 30, 2016, now Pat. No. 10,010,135.

(51) Int. Cl.
*A43B 17/00* (2006.01)
*A43B 23/08* (2006.01)

(56) References Cited

U.S. PATENT DOCUMENTS

| | | | | |
|---|---|---|---|---|
| 5,311,677 A * | 5/1994 | Mann | A43B 21/32 | 36/35 R |
| 5,435,078 A * | 7/1995 | Pyle | A43B 13/12 | 36/31 |
| 5,768,801 A * | 6/1998 | Huff | A43B 13/187 | 36/28 |
| 5,775,005 A * | 7/1998 | McClelland | A43B 13/184 | 36/31 |
| 5,901,468 A * | 5/1999 | Whyte | A43B 17/023 | 36/43 |
| 6,038,790 A * | 3/2000 | Pyle | A43B 7/144 | 36/28 |
| 6,508,017 B1 * | 1/2003 | DeBarro | A43B 7/1425 | 36/31 |
| 6,574,886 B1 * | 6/2003 | Issler | A43B 9/02 | 36/37 |
| 7,200,955 B2 * | 4/2007 | Foxen | A43B 7/1445 | 36/31 |
| 7,685,741 B2 * | 3/2010 | Friedman | A43B 17/006 | 36/25 R |
| 7,832,118 B2 * | 11/2010 | Holden | A43B 21/28 | 36/35 R |
| 7,941,938 B2 * | 5/2011 | Yu | C08L 9/02 | 36/28 |
| 8,713,818 B2 * | 5/2014 | Doerer | A43B 7/144 | 36/35 R |
| 8,819,961 B1 * | 9/2014 | Ellis | A43B 7/1463 | 36/43 |
| 12,082,645 B2 * | 9/2024 | Lovell | A43B 13/04 | |
| 2003/0150131 A1 * | 8/2003 | McManus | A43B 7/1445 | 36/28 |
| 2004/0181970 A1 * | 9/2004 | Covatch | A43B 17/00 | 36/28 |
| 2006/0075658 A1 * | 4/2006 | Mitchell | A43B 13/16 | 36/28 |
| 2007/0017122 A1 * | 1/2007 | Feller | A43B 7/1445 | 36/76 R |
| 2007/0186446 A1 * | 8/2007 | Lafortune | A43B 17/18 | 36/43 |
| 2009/0193682 A1 * | 8/2009 | Rosenbaum | A43B 13/141 | 36/31 |
| 2011/0214310 A1 * | 9/2011 | Rosenbaum | A43B 7/144 | 36/28 |
| 2013/0000151 A1 * | 1/2013 | Campbell | A43B 13/189 | 36/102 |
| 2013/0160322 A1 * | 6/2013 | Ellis | A43B 13/189 | 36/28 |
| 2013/0305568 A1 * | 11/2013 | Chen | A43B 9/04 | 36/103 |
| 2018/0000196 A1 * | 1/2018 | Lovell | A43B 7/148 | |

* cited by examiner

COMFORT SYSTEM FOR BOOTS

CROSS REFERENCE TO RELATED APPLICATIONS

This application is a continuation application of U.S. Non-Provisional patent application Ser. No. 17/835,123, filed Jun. 8, 2022 and titled "Comfort System for Boots," which is the continuation application of U.S. Non-Provisional patent application Ser. No. 16/860,463, filed Apr. 28, 2020 and titled "Comfort System for Boots," which is the continuation application of U.S. Non-Provisional patent application Ser. No. 15/981,188, filed May 16, 2018 and titled "Comfort System for Boots," which is is a continuation application of U.S. Non-Provisional patent application Ser. No. 15/198,968, filed Jun. 30, 2016 and titled "Comfort System for Boots." The contents of the above-identified Applications are relied upon and incorporated herein by reference in their entirety.

FIELD OF THE INVENTION

The invention pertains to a comfort system for boots joined together by a Goodyear Welt, such system enhancing the comfort of the boots, without negative impact upon durability of the boots.

BACKGROUND OF INVENTION

The invention relates generally to boots, such as cowboy boots and work boots, which employ a comfort system, relying upon vertically aligned foamed plastic pads, at strategic areas, of high impact, such as the ball and heel areas of the boot. The comfort system is compact and fits easily into the interior of the boot. One pair of pads is secured to an insole liner backing board, while another pair of pads is secured to the upper surface of the midsole.

The Goodyear welt system is widely used in the manufacture of boots and shoes. The Goodyear welt stitch is applied to the shoe or boot with a great amount of pressure, and a rigid inner sole board must be strong enough to withstand such pressure. However, the rigid inner sole board presents a source of discomfort to the wearer, and resilient cushioning pads have been employed in some boots, in an effort to minimize such discomfort.

To illustrate, U.S. Pat. No. 5,911,491, granted to Marvin 0 Huff, discloses a comfort system for a shoe or boot, including a rigid inner sole board (10). Full-length cushioning pad (15) is placed on top of the innersole board, and precut detachable pieces (11a, 11b) are defined on the innersole board. Removing the detachable pieces allows rectangular cushioning pads (20a, 20b) to contact the cushioning pad to provide additional cushioning effect. The rectangular pads are located at the heel of the boot, and under the ball of the foot of the wearer, the points of maximum impact for the wearer of the boot.

While the comfort system disclosed in Huff represented a step forward, such comfort system exhibited shortcomings. The amount of cushioning achieved by such system was limited by the compression of pad (15) and cushioning pads (20a, 20b). While the full length pad is of uniform thickness, the polyurethane cushioning pad located at the heel of the boot may be considerably thicker than the polyurethane cushioning pad attached at the forepart of the innersole board, as noted in column 3 lines 25-35 of Huff.

SUMMARY OF THE INVENTION

It is an object of the present invention to provide a comfort system that employs two pairs of foamed polyurethane pads. One pair of pads is secured to the insole liner backing board, and the second pair of pads is retained in recesses on the upper surface of the midsole. The pads in the vicinity of the ball of the foot are vertically aligned, and the pads in the vicinity of the heel of the wearer are also vertically aligned.

It is another object of the invention to provide an insole chassis, with two apertures, to allow one pair of foamed plastic pads secured to an insole chassis backing board, to pass freely therethrough.

It is another object of the invention to provide a safety boot with a steel toe or hard plastic insert that protects the toes of the wearer.

It is another object of the invention to provide a midsole with a depending rim that fits over, and around, a foamed polyurethane filler pad that enhances the performance of the comfort system by absorbing shocks.

Other objects, and advantages, of applicants' comfort system, will become apparent when the specification is construed in harmony with the appended drawings.

DETAILED DESCRIPTION OF THE INVENTION

Figure 1:
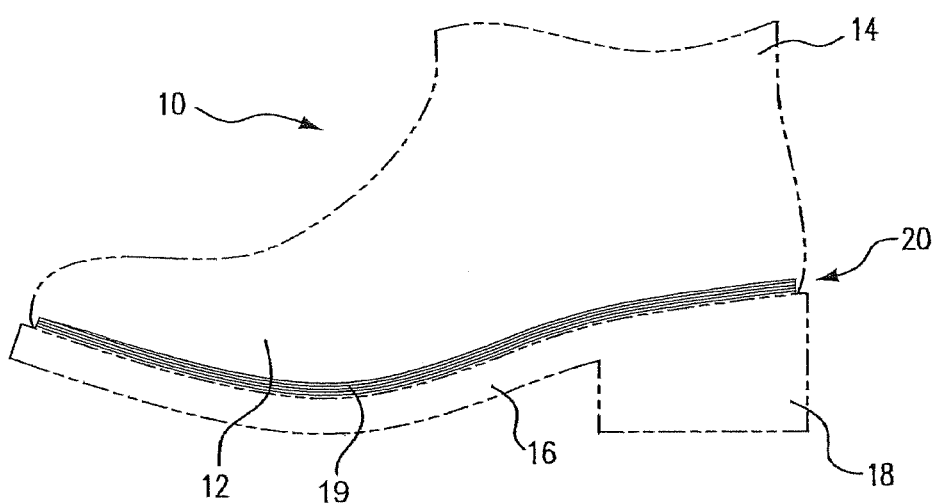
FIG. 1 is a side elevational view of a cowboy boot employing a first embodiment of applicant's comfort system.

FIG. 1 is a side elevational view of a cowboy boot 10 shown in dotted outline, and identified, generally, by reference numeral 10. The boot includes an upper 12 and a shaft 14 that fits about the calf area of the wearer of the boot. Outer sole 16 is located at the base of the boot, and heel 18 is formed at the rear of the outer sole. The comfort system, indicated generally by reference numeral 20, is located in the interior of the boot, and extends from the heel to the toe of upper 12. Upper 12 is secured to the insole of the boot along welt 19 as part of by the Goodyear welting process. The midsole is cemented, and then stitched to the welt. The midsole is cemented, and then stitched to welt 19.

Figure 2:
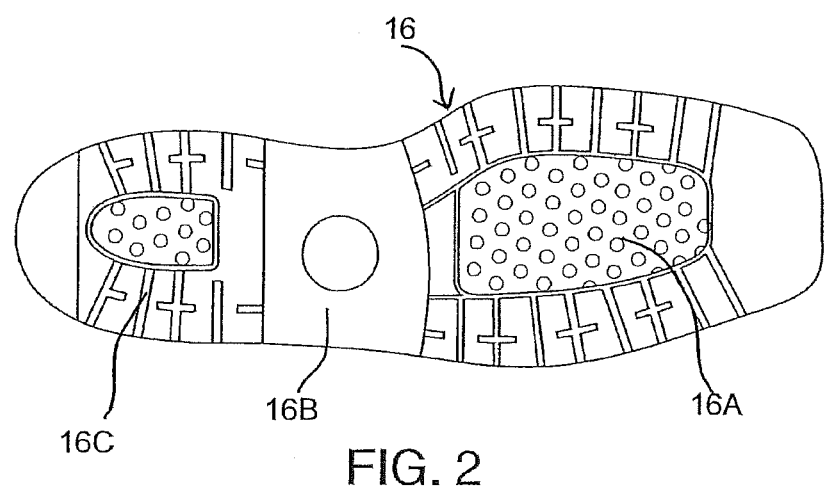
FIG. 2 is a bottom plan view of the outer sole of the boot.

FIG. 2 show, the underside of outer sole 16 that contacts the ground. Outer sole 16 comprises a front section 16 A, a midsection 16 B, and a rear section, or heel 18.

Figure 3A:
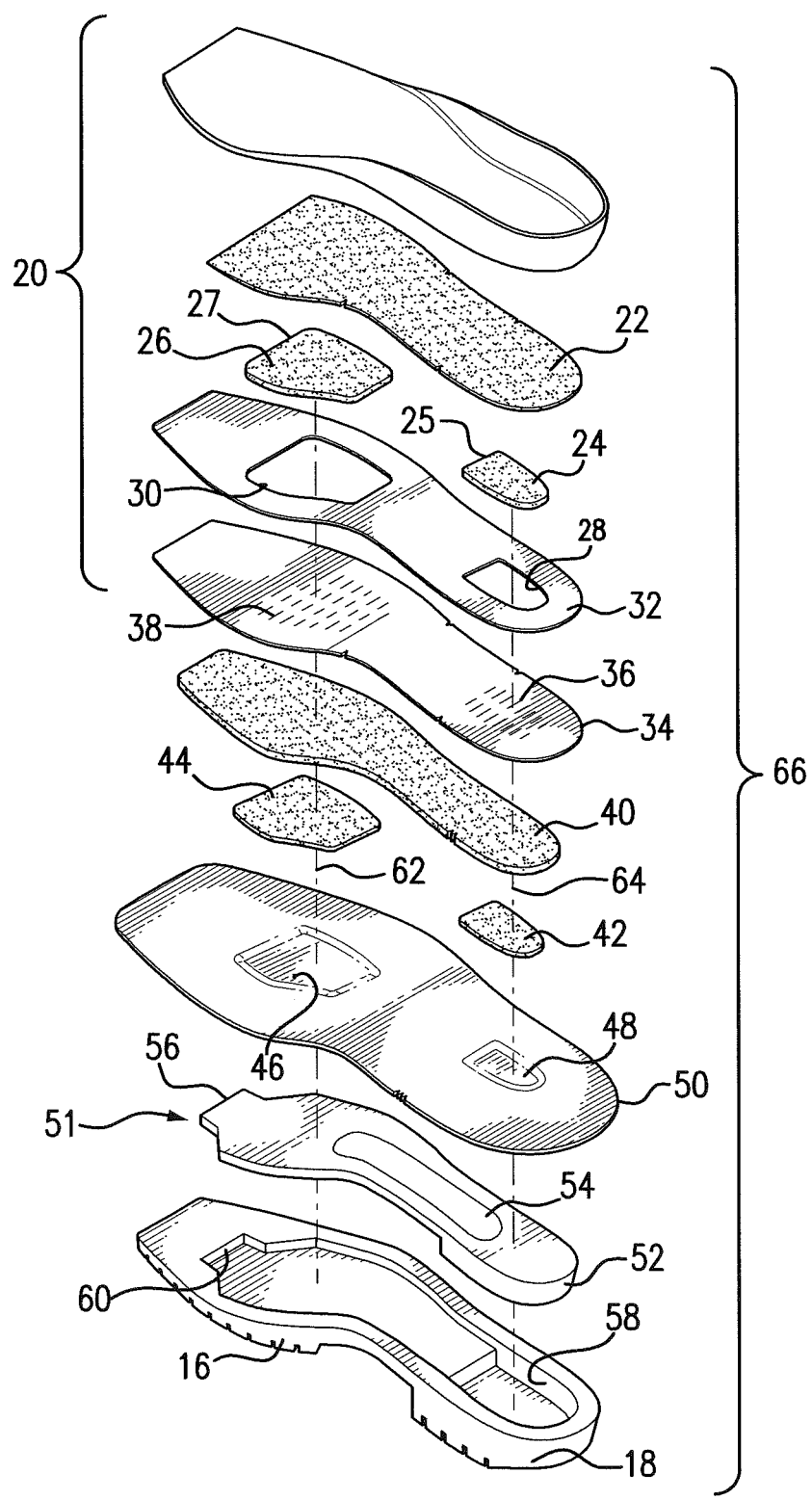
FIG. 3A is an exploded perspective of the comfort system of FIG. 1, taken from a first vantage point.
Figure 3B:
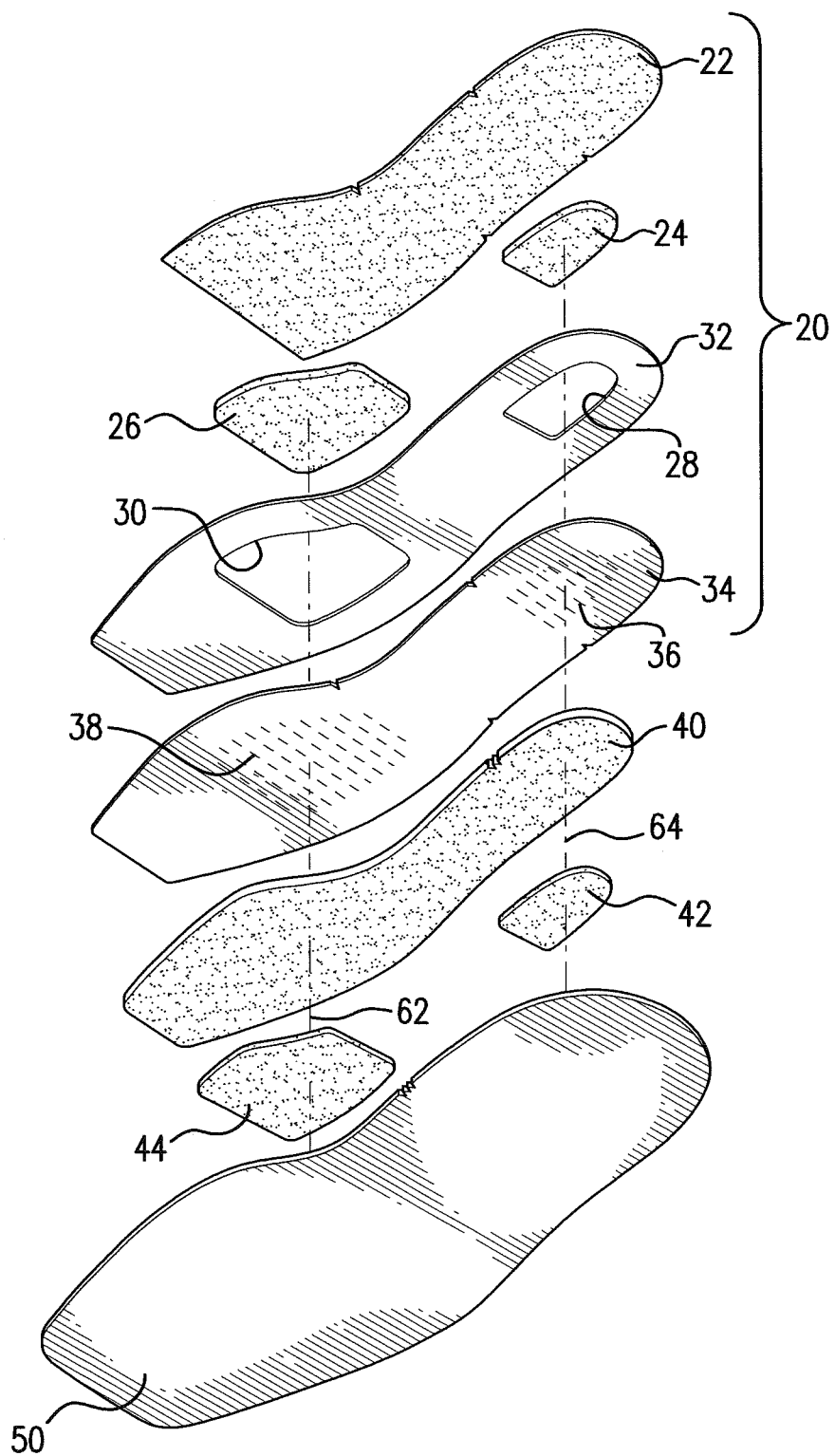
FIG. 3B is an exploded perspective of a portion of the comfort system of FIG. 1, taken from a second vantage point.

Smaller bracket 20, shown in FIGS. 3A and 3B, encompasses the components of the comfort system located in the interior of boot 10. Larger bracket 66, shown only in FIG. 3A, shows all of the components that comprise the comfort system, plus midsole 50, insert 51, shank 54, and outer sole 16, which are located below the midsole and complete the boot 10.

FIGS. 3A and 3B are exploded perspective views of applicant's comfort system, and are taken from different vantage points to clearly show the upper and lower surfaces of each component. A removable orthotic 21 receives the foot of the wearer of the boot. Insole cover layer 22, of foamed polyurethane, extends from the heel of the boot toward the ball of the foot of the wearer and performs a shock absorbing function. Foam pads 24, 26 are located beneath layer 22, and pass through into apertures 28, 30 in insole chassis 32. Pad 24 is located under the heel of the wearer of the boot, while pad 26 is located under the forepart or ball of the foot of the wearer.

Pad 24 approximates an ellipse. Pad 24, has a transverse leading edge 25; pad 26 is widest at its leading edge 27 and tapers rearwardly. Insole chassis backing board 34 is located below insole chassis 32, and pads 24, 26 are secured to the upper surface of insole chassis backing board 34. Score lines 36 are formed in board 34 below the heel of the wearer, and in vertical alignment with pad 24 and aperture 28. Score lines 38 are also formed in the insole chassis backing board 34 below the ball of the foot of the wearer, and in vertical alignment with pad 26 and aperture 30. The score lines impart flexibility to the insole chassis backing board 34, in selected areas, in the vertical direction.

Insole chassis backing board 34 is the last of the components of the comfort system retained within the interior of the boot. Bracket 20, shown in FIGS. 3A and 3B encloses the components of the comfort system.

Insole filler layer 40, formed of foamed plastic material, is located beneath insole chassis backing board 34. Foamed plastic pads 42 and 44 fit into recesses 46, 48 on the upper face of midsole 50. Foamed plastic pads 42, 44 are similar in shape to foamed plastic pads 24, 26, are formed of similar plastic materials, and are in vertical alignment therewith. Insole filler layer 40 overlies midsole 50. Foamed plastic pads 42, 44 are retained in recesses 46, 48 on the upper surface of midsole 50.

Support layer, indicated generally by reference numeral 51, is fabricated with a soft polyurethane core 52, which is more flexible than outer sole 16. Nylon shank 54 embedded in the core to provide additional strength and rigidity, and layer complete layer 51.

An upwardly opening cavity 58 is defined in the upper surface of outer sole 16 and heel 18. Tab 56, formed at the leading front end of layer 51 is inserted into notch 60 on outer sole, to locate layer 18 within cavity 58 in outer sole 16.

Lead line 62 shows the vertical alignment of pad 26, aperture 30 in insole chassis backing board 34, and pad 44 retained in recess 46 on the upper surface of midsole 50. Insole cover layer 22 and filler layer 40 are also properly aligned.

Lead line 64 shows the vertical alignment of pad 24, aperture 28 in insole chassis 32, score lines 36 in insole chassis backing board 34, and pad 42 retained in recess 48 on the upper surface of midsole 50. Insole cover layer 22 and filler layer 40 are also properly aligned.

Pad 26 includes a leading edge 27 and a parallel trailing edge. The sidewall is perpendicular to the leading and trailing edges. The other sidewall tapers inwardly from leading edge 27 toward the trailing edge, to approximate the shape of the ball of the foot. Pad 44 is shaped in a similar manner.

Pad 24 has a leading edge 25 that extends perpendicularly part-way across the heel area of insole chassis board 32. Pads 24 and 26 are glued, or cemented, to the upper surface of insole chassis backing board 34. Pads 26 and 44 are similar in shape, and elliptical pads 24 and 42 are similar in shape. The thickness of the pads does not exceed the thickness of insole chassis 32, so that comfort system 20 is compact, and consumes a minimum amount of space within the interior of boot 10.

Figure 4:
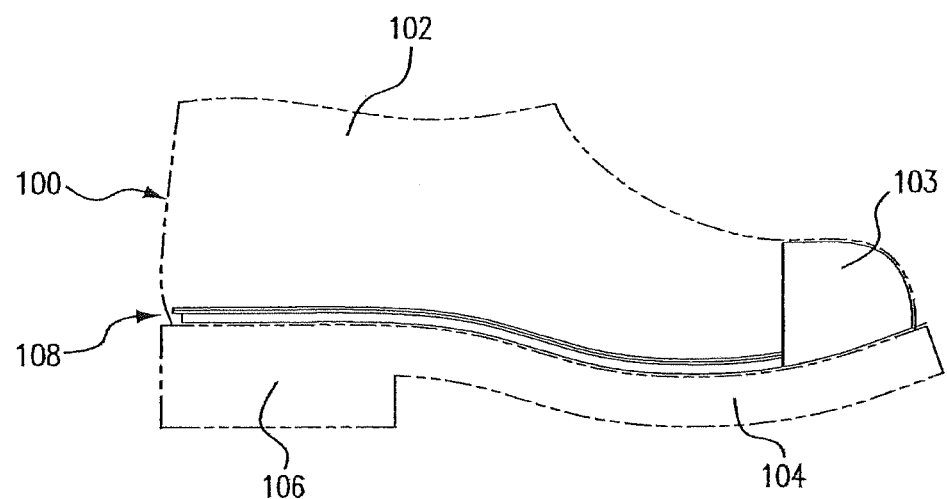
FIG. 4 is a side elevational view of a work boot, with a steel toe insert, employing a second embodiment of applicant's comfort system.

FIG. 4 is a side elevational view of a work boot, shown in dotted outline, and identified generally by reference numeral 100. The boot includes an upper 102, a steel toe insert 103, and an outer sole 104 with a heel 106. Comfort system 108 is situated in the interior of the upper, when the upper is secured to the inner sole, as part of a known welting process, such as the Goodyear welting process.

Metal toe insert 103 includes body 124, which is generally C-shaped in cross-section, with spaced opposing lips 126, 128. The lips engage the forward end of midsole 117, so that the insert 103 protects the toes of the wearer of the boot. The forward edge of midsole 117 presses against barrier 132 at the closed end of insert 103 for proper alignment.

Figure 5:
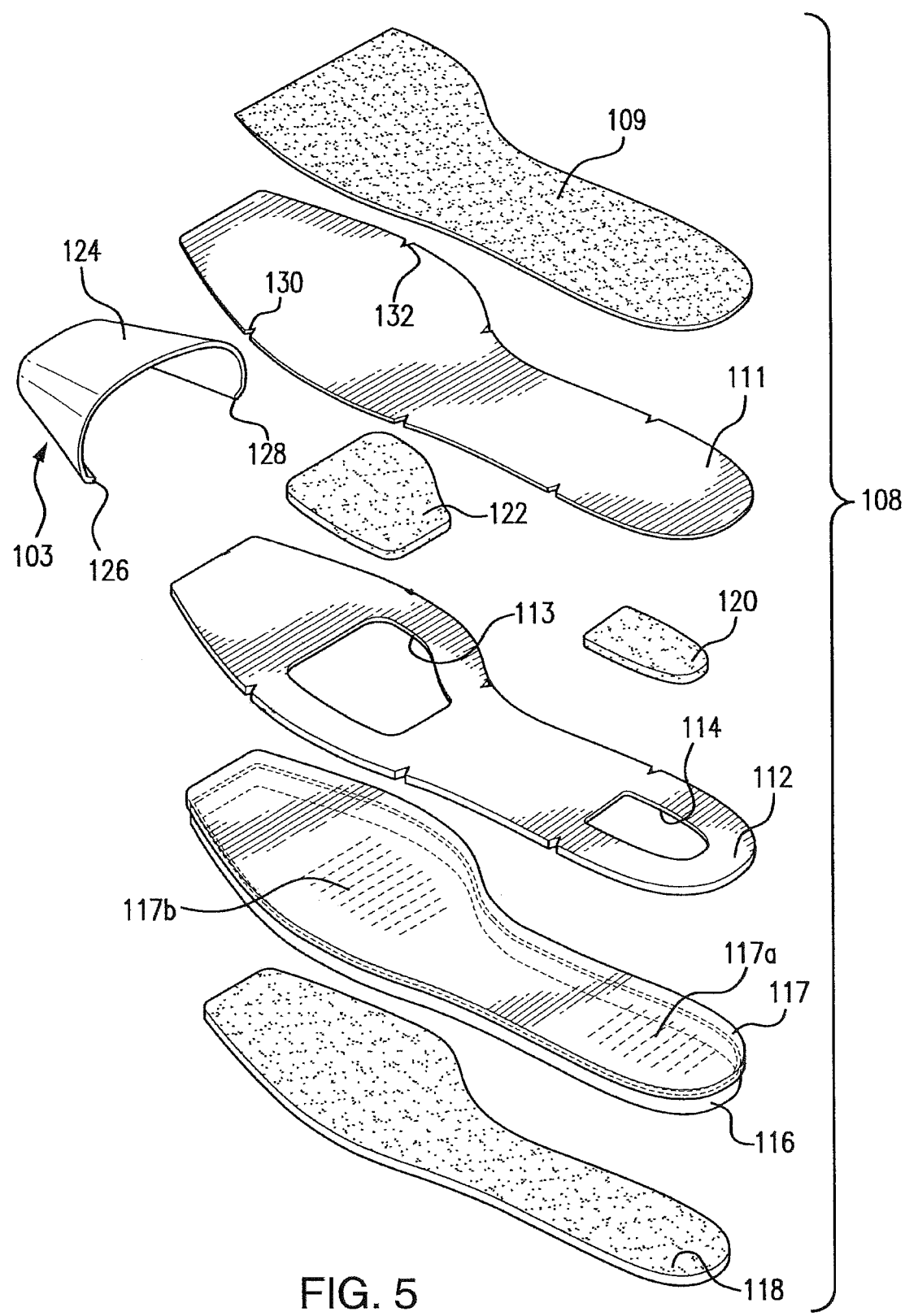
FIG. 5 is a perspective view and steel toe insert of the comfort system of FIG. 4, taken from a first vantage point, and showing the steel toe insert.
Figure 6:
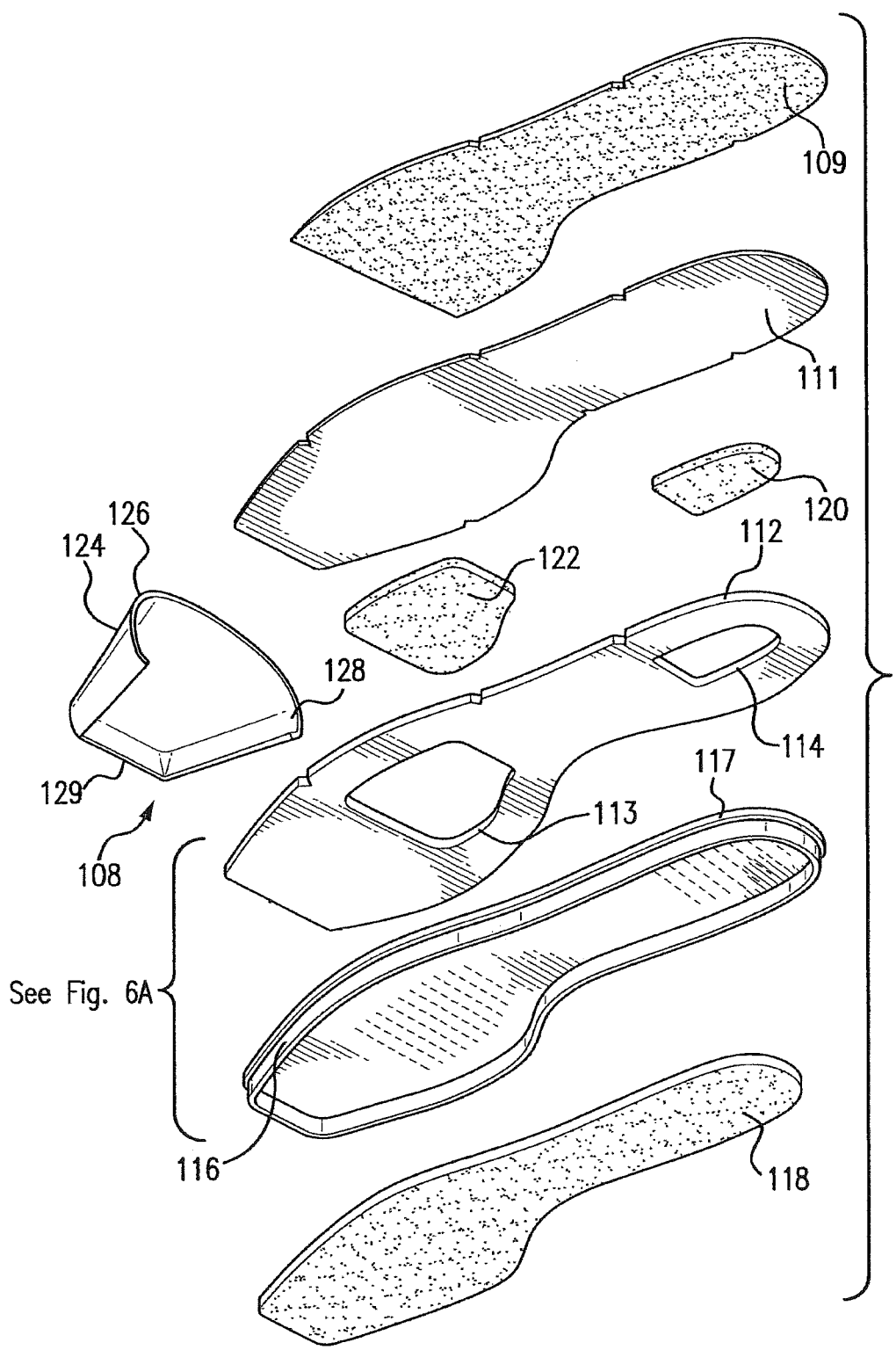
FIG. 6 is another perspective view of the comfort system of FIG. 4, taken from a second vantage point; and showing the steel toe insert.
Figure 6A:
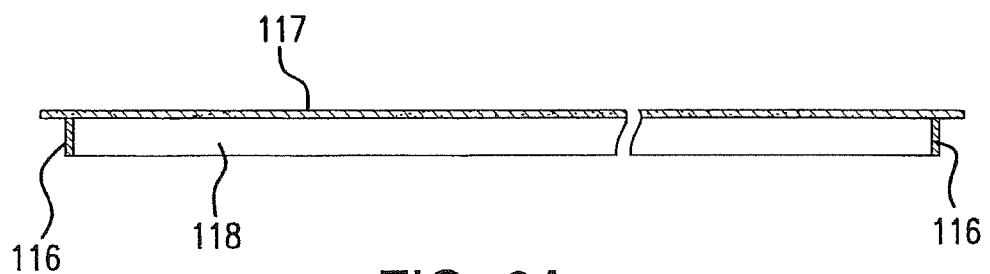
FIG. 6A shows the insole chassis backing board, midsole with depending rim, and foamed pad of FIG. 6 in assembled condition.

FIGS. 5 and 6 show an alternative configuration of the comfort system 108.0 System 108 includes foam insole ever 109, liner board 111, and insole chassis 112. Apparatus 113, 114 are defined in the forepart and heel areas of insole chassis 112, and pads 120 and 122 pass through the apparatus.

Midsole 117 is located beneath insole chassis 112, and a rim 116 depends from the midsole. Rim 116 is located along the periphery of the midsole, and foamed filler pad 118 fits within the contour of rim 116. Pads 120, 122 are secured to the upper surface of midsole 117, and pass through apparatus 113, 114 in insole chassis 112. Score lines 117a, 117b impair flexibility to midsole 117.

Comfort system 108 includes foam insole cover 109, liner board 111, insole chassis 112, midsole 116, insole chassis backing board 117 and foamed plastic filler pad 118. Insole chassis backing board is secured to the upper surface of insole backing board 117.

A rigid rim 116 depends below insole chassis backing board 117. The rib is formed of rib tape. Foamed plastic pad fits within the contours of rim 116, to attenuate and/or absorb shock loading. Pads 120 and 122 are glued to the upper surface of insole chassis backing board 117.

Metal toe insert 103 comprises body 124, which is generally C-shaped in cross-section, with spaced opposing lips 126, 128. The lips engage the forward end of insole chassis 112, and the lateral sider of insole chassis 112 may be notched to facilitate alignment. Alternatively, inset may be formed of a high-string in plastic.

Figure 7:
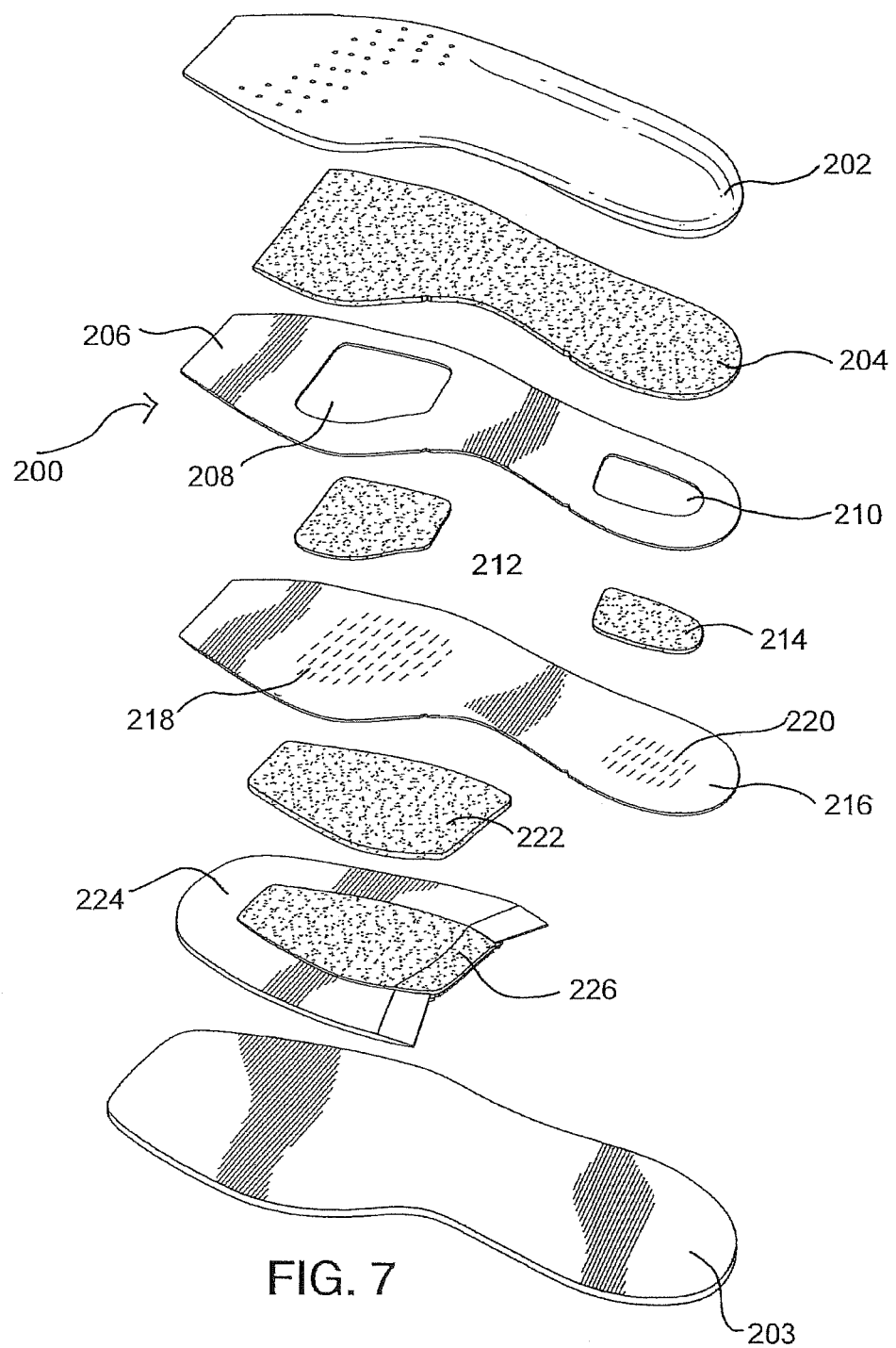
FIG. 7 is an exploded perspective of a third embodiment of applicant's comfort system, taken from a first vantage point.
Figure 8:
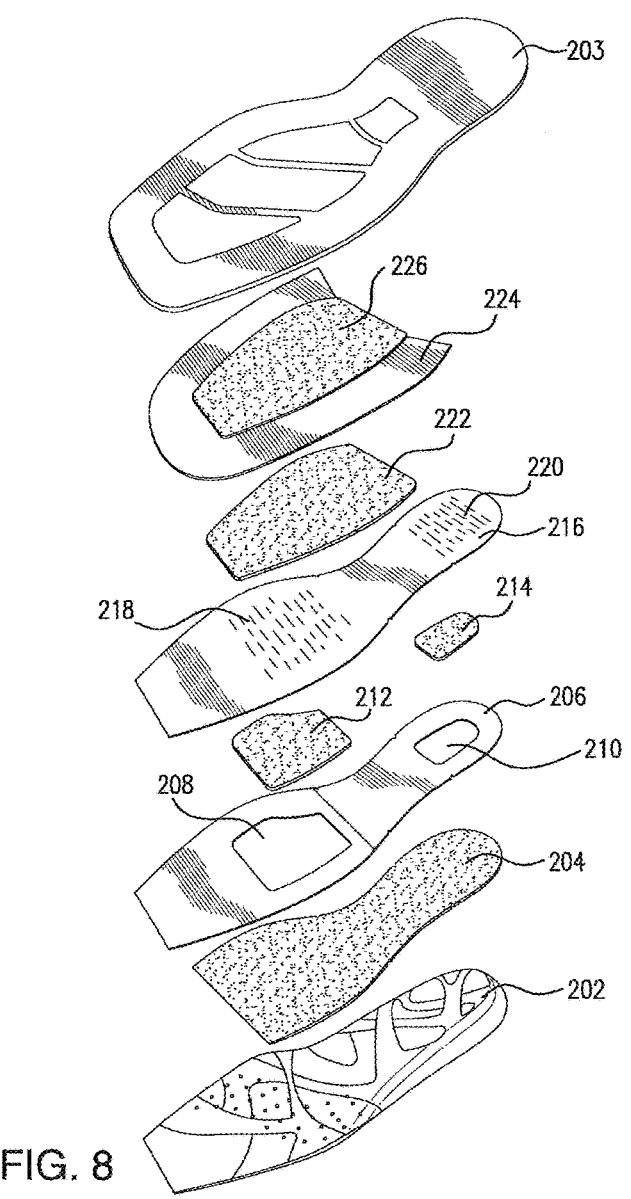
FIG. 8 is another exploded perspective of the third embodiment of applicant's comfort system, taken from a second vantage point.

FIGS. 7 and 8 depict another embodiment of applicant's comfort system, which is identified, generally, by reference numeral 200. FIG.? shows the components of system 200, in an exploded perspective view, with orthotic insert 202 on top, and outsole 203, on the bottom. FIG. 8 is taken from a different perspective, and shows the components with outsole 203 on top, and orthotic 202 on the bottom.

Orthotic 202 is a soft foam member shaped to receive the foot of the wearer. Orthotic 202 is removable from the boot, and can be and cleaned, and re-inserted into the boot (not shown).

Shock absorbing foam insole cover 204 is located beneath, and adjacent to orthotic 202. The cover, which extends from the heel toward the ball of the foot of the wearer, conforms to the foot of the wearer. Insole chassis 206 is located beneath, and adjacent to, insole cover 204. A large aperture 208 is located in the forepart of insole chassis 206, and a smaller, elliptical aperture 210 is located in the area of the heel of the wearer.

Foam pads 212,214 are secured to the upper surface of insole chassis backing board 216 in the vicinity of the ball and heel of the foot of the wearer. Several score lines 218 and 220 are cut into insole chassis backing layer 216 to increase its flexibility.

Insole filler pad 222 is located beneath insole chassis backing board 216 for shock attenuation. Pad 222 is formed of a foamed plastic, and contacts, and presses against the forepart of insole chassis backing layer 216. Midsole retainer 224 is horse-shoe shaped, and cushion or pad 226 is retained within the horse-shoe shape. Midsole retainer 224 rests upon outsole 203, which serves as a platform to support comfort system 200. Comfort system 200 provides vertical alignment of pads 212, 222 and 226 in the forepart of the boot, i.e. under the ball of the foot of the wearer. Pad 214 is retained in alignment with the heel of the wearer of the boot. The pads remain in alignment due to the compressive forces applied to the insole cover 204 and midsole pad 226, by the wearer of the boot. Alignment of the resilient pads are maintained by apertures 208,210 in insole board layer 206. (Apertures not shown in 208)

Revision and modifications to the three disclosed embodiments of applicant's invention may occur to the skilled artisan, after contemplating the specification, without departing from the spirit of applicant's invention. For example, the foamed plastic pads on the insole chassis backing board and on the midsole, may be made of different foamed plastics with different functional characteristics. The pads under the ball of the foot may exhibit a rebound characteristic, while the pads under the heel may exhibit a shock absorbing characteristic. A layer of reinforcing material may be applied to the forward end of the midsole, in the vicinity of the steel toe, in the embodiment of FIGS. 4-6, to further strengthen the work boot. Consequently, the claim should be broadly construed in a manner consistent with the spirit and scope of applicants' invention, and should not be limited to their literal terms.

PARTS LIST 1 FOR FIGS. 1-3

10—boot
12—upper
14—shank
16—outer sole
18—heel
19—welt
20—comfort system within bracket 16A, 16B, 16C—parts of outer sole 16 16A, 16B, 16C—sections of outer sole 16 (see FIG. 2)
66—(shown only in FIG. 3A)
50—midsole
51—insole
21—removable orthotic
22—insole cover layer
24, 26—foam pads
28, 30—apertures in insole chassis
32—insole chassis
25—leading edge on pad 24
27—leading edge on pad 26
34—insole chassis backing board
36, 38—score lines on backing board 34
40—insole filler layer
42, 44—foam pads
51—support layer
52—core of layer 51
54—nylon shank
58—cavity in outer sole 16
56—tab on layer 51
60—notch (to receive tab)
62, 64—lead lines showing vertical alignment

PARTS LIST FOR FIGS. 4-6A DISCUSSED BELOW

100—work boot (in general)
102—upper
103—steel toe insert
104—outer sole
106—heel
108—comfort system
109—foam insole cover
111—liner board
112—insole chassis
117—midsole with depending rim 16; 117a, 117b—score lines on midsole
118—foam filler pad
113, 114—apertures in insole chassis 112
124—body (of insert 103)
126, 128—lips of insert
132—barrier (at closed end of insert 103)

PARTS LIST FOR FIGS. 7-8 DISCUSSED BELOW

200—comfort system
202—orthotic insert
203—midsole
204—insole cover
206—insole chassis with apertures 208,210
212,214—foam pads
216—insole chassis backing layer
222—midsole pad
224—midsole retainer
226—midsole pad

What is claimed is:
1. A boot comprising:
an upper;
an outsole;
a midsole;
a comfort system located within said upper;
said comfort system comprising:
an insert;
an insole cover;
an insole chassis with at least one insole chassis aperture;
an insole chassis backing board; and
at least one insole cushioning pad;
wherein an insole filler layer is located in between said insole chassis backing board and said midsole;
wherein at least one midsole cushioning pad is located in between said insole filler layer and said midsole.

2. A boot according to claim 1, wherein said at least one cushioning pad is secured to said insole chassis backing board and passes through said at least one insole chassis aperture.

3. A boot according to claim 1, wherein said midsole further comprises at least one midsole recess.

4. A boot according to claim 3, wherein said at least one midsole cushioning pad is retained within said at least one midsole recess.

5. A boot according to claim 4, wherein said at least one insole cushioning pad, said insole filler pad, and said midsole cushioning pad are generally vertically aligned.

6. A boot according to claim 1, wherein said upper is secured to said comfort system along a welt line as part of a welting system.

7. A boot according to claim 1, wherein said insert is orthotic and removable.

8. A boot according to claim 1, wherein said insole chassis further comprises a second insole chassis aperture.

9. A boot according to claim 8, wherein said comfort system further comprises a second insole cushioning pad.

10. A boot according to claim 9, wherein said second cushioning pad is secured to said insole chassis backing board and passes through said second insole chassis aperture.

11. A boot comprising:
an upper;
a midsole;
an outsole with an outsole cavity;
a support layer located within said outsole cavity;
wherein said support layer further comprises a shank;
a comfort system located within said upper;
said comfort system comprising:
  a removable orthotic insert;
  an insole cover layer;
  an insole chassis with an insole chassis aperture;
  an insole chassis backing board;
  an insole cushioning pad secured to said insole chassis backing board and passing through said insole chassis aperture;
  an insole filler layer;
  at least one midsole cushioning pad secured to said midsole;
wherein a thickness of said at least one insole cushioning pad is less than or equal to a thickness of said insole chassis.

12. A boot comprising:
an upper;
an outsole;
a midsole;
a comfort system located within said upper;
said comfort system comprising:
  an insert;
  an insole cover;
  an insole chassis with at least one insole chassis aperture;
  an insole chassis backing board; and
  at least one insole cushioning pad;
wherein an insole filler layer is located in between said insole chassis backing board and said midsole.

13. A boot according to claim 12, wherein said at least one insole cushioning pad is secured to said insole chassis backing board and passes through said at least one insole chassis aperture.

14. A boot according to claim 12, wherein said comfort system further comprises at least one midsole cushioning pad.

15. A boot according to claim 14, wherein said at least one midsole cushioning pad is located in between said insole filler layer and said midsole.

16. A boot according to claim 14, wherein at least one recess is located on an upper face of said midsole.

17. A boot according to claim 16, wherein said at least one midsole cushioning pad fits in said at least one recess.

18. A boot according to claim 12, wherein said upper is secured to said comfort system along a welt line as part of a welting system.

19. A boot according to claim 12, wherein at least one support layer is located in between said upper and midsole.

20. A boot according to claim 11, wherein said upper is secured to said comfort system along a welt line as part of a welting system.

* * * * *